US008098913B2

United States Patent
Osumi et al.

(10) Patent No.: US 8,098,913 B2
(45) Date of Patent: Jan. 17, 2012

(54) ULTRASONIC DIAGNOSTIC APPARATUS AND IMAGE FILTERING METHOD OF THE SAME

(75) Inventors: Ryota Osumi, Nasushiobara (JP); Takeshi Sato, Nasushiobara (JP); Fumiyasu Sakaguchi, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 940 days.

(21) Appl. No.: 12/017,868

(22) Filed: Jan. 22, 2008

(65) Prior Publication Data
US 2008/0175454 A1 Jul. 24, 2008

(30) Foreign Application Priority Data

Jan. 23, 2007 (JP) .................. 2007-012844
Jan. 17, 2008 (JP) .................. 2008-007504

(51) Int. Cl.
*A61B 8/00* (2006.01)
(52) U.S. Cl. ........................ 382/128; 600/459
(58) Field of Classification Search .................. 382/128, 382/260, 262; 600/459
See application file for complete search history.

(56) References Cited

U.S. PATENT DOCUMENTS 5,921,931 A * 7/1999 O'Donnell et al. ........... 600/441
6,058,405 A * 5/2000 Kolte et al. ................... 708/304
6,730,035 B2 * 5/2004 Stein .............................. 600/449
6,754,684 B1 * 6/2004 Kotlov .......................... 708/202
6,817,982 B2 * 11/2004 Fritz et al. ..................... 600/443
2007/0167766 A1 7/2007 Takimoto et al.

FOREIGN PATENT DOCUMENTS

| JP | 5-300372 | | 11/1993 |
| JP | 11-149554 | * | 6/1999 |
| JP | 2000-262520 | | 9/2000 |

OTHER PUBLICATIONS

Office Action issued Nov. 1, 2011 in Japanese Patent Application No. 2008-007504 filed Jan. 17, 2008 (with English Translation).

* cited by examiner

*Primary Examiner* — Stephen Koziol
(74) *Attorney, Agent, or Firm* — Oblon, Spivak, McClelland, Maier & Neustadt, L.L.P.

(57) ABSTRACT

An ultrasonic diagnostic apparatus uses the pixel value of each of the pixels found in a predetermined range relative to a reference position of image data as input matrix and computes an output value corresponding to the input at its image processing section. Thereafter, the sorting filter of the image processing section sorts the elements of each row of the input matrix on a column by column basis. Then, it extracts a partial matrix having the row including the reference position and surrounding rows from the matrix obtained as a result of the sorting and having a number of rows smaller than number of rows of the input matrix and a number of columns same as the number of columns of the input matrix. Furthermore, it computationally determines the median of the elements of the partial matrix and outputs the median as the output value.

21 Claims, 8 Drawing Sheets

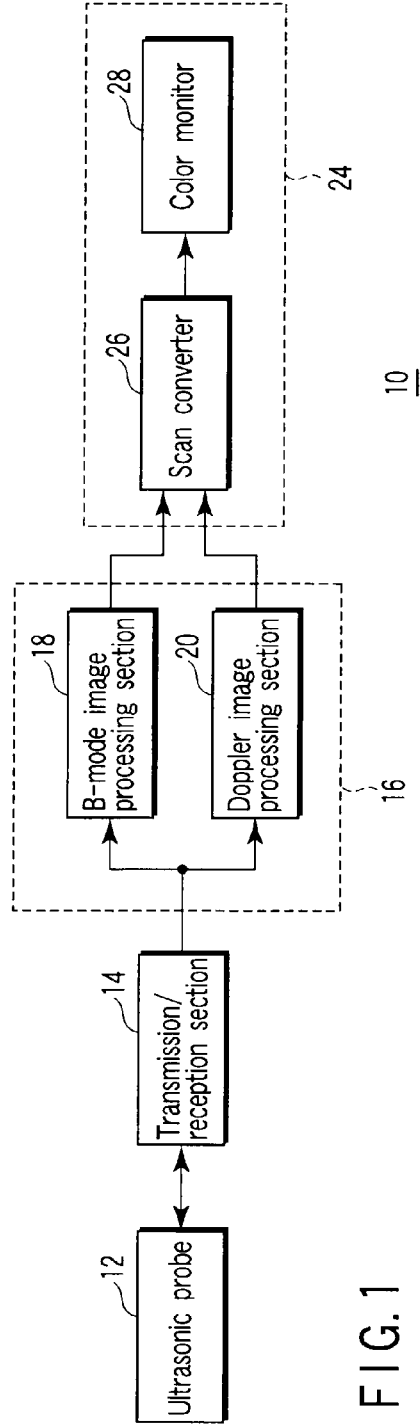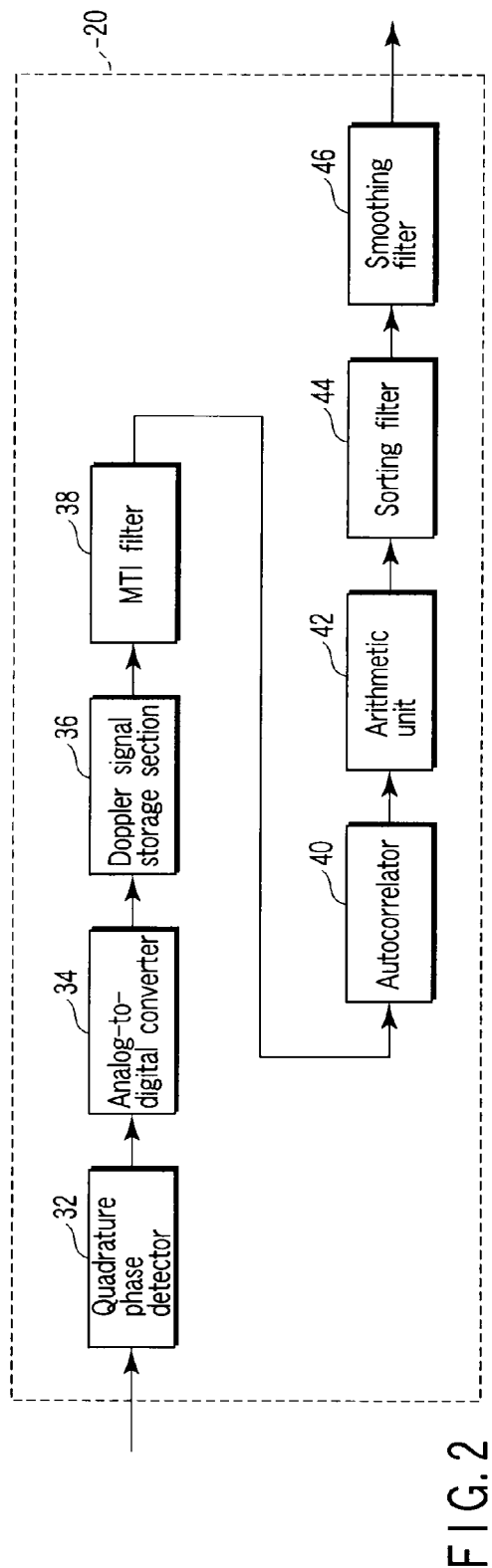

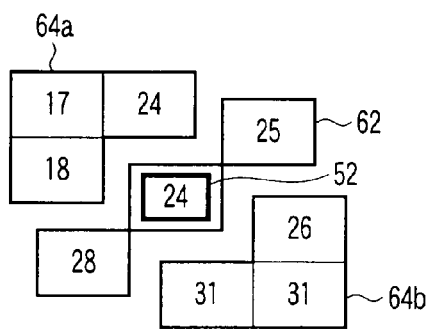
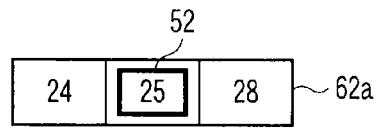
FIG. 4A  FIG. 4B  FIG. 4C  FIG. 4D  FIG. 4E  FIG. 4F

ULTRASONIC DIAGNOSTIC APPARATUS AND IMAGE FILTERING METHOD OF THE SAME

CROSS-REFERENCE TO RELATED APPLICATIONS

This application is based upon and claims the benefit of priority from prior Japanese Patent Applications No. 2007-012844, filed Jan. 23, 2007; and No. 2008-007504, filed Jan. 17, 2008, the entire contents of both of which are incorporated herein by reference.

BACKGROUND OF THE INVENTION

1. Field of the Invention

This invention relates to an ultrasonic diagnostic apparatus and an image filtering method of the same. More particularly, the present invention relates to an image filtering method of an ultrasonic diagnostic apparatus adapted to forming an image according to an ultrasonic Doppler signal obtained from an object of examination.

2. Description of the Related Art

Among various filter processes for processing raster images, the process using a median filter (a median extracting filter) is known to be effective for removing noises, reducing missing pixels and smoothing, while maintaining the resolution and the boundaries of objects in the image. The color Doppler method currently being used for ultrasonic diagnostic processes represents a typical application of median filters.

The color Doppler method is a technique of scanning a living body along a predetermined cross section by means of an ultrasonic pulse, capturing the Doppler frequency deviation that arises as a function of the speed of a moving reflecting object (the speed of flowing blood) when an ultrasonic is irradiated onto the moving reflecting object such as blood (blood cells) and visualizing it as an image. While an excellent gauging accuracy (particularly a low running speed sensing ability), a remarkable temporal resolution and also a good spatial resolution are required to improve the diagnostic accuracy of the color Doppler method, it is difficult to highly satisfy the requirements at the same time. For this reason, a technique of smoothing the boundary lines of blood vessels and blood flow distributions, removing noises and reducing image skips (so called a black failure pattern) that arise due to the phenomenon of interference of ultrasonic by means of a two-dimensional median filter (median extracting filter) is proposed to cope with the problem of degradation of spatial resolution (see, for example, Jpn. Pat. Appln. Publication No. 2000-262520).

However, a median filtering process is intrinsically an operation of sorting (rearranging) data and involves a large number of computations for comparisons and replacements. Thus, various techniques have been proposed to reduce the number of computations of a sorting operation in a median filtering process.

For example, a technique of firstly sorting each of the columns of the data of three rows and three columns, then sorting each of the rows and finally sorting three data on the diagonals to acquire the median value thereof (see Jpn. Pat. Appln. Publication No. 11-149554). "Fast Algorithms for Median Filtering", Intel Corporation, 2001 shows a method of sorting data up to five rows and five columns at maximum in stead of three rows and three columns.

The algorithms described in Jpn. Pat. Appln. Publication No. 11-149554 and "Fast Algorithms for Median Filtering", Intel Corporation, 2001 cited above are effective when computing a plurality of data simultaneously by means of a single instruction multiple data (SIMD) processor. However, they still require a large number of computations for a median filtering process.

BRIEF SUMMARY OF THE INVENTION

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

Therefore, it is an object of the present invention to provide a high-speed ultrasonic diagnostic apparatus having an effect of smoothing, removing noises and reducing image skips same as a median filter and an advantage of a smaller number of computations than a median filter and an image filtering method of such an apparatus.

In an aspect of the present invention, there is provided an ultrasonic diagnostic apparatus for using a pixel value of each of pixels found in a predetermined range relative to a reference position of image data as input matrix and computing an output value corresponding to the input, the apparatus including:

an image processing section which sorts elements of each row of the input matrix on a column by column basis, extracts a partial matrix having the row including the reference position, surrounding rows from the matrix obtained as a result of the sorting and computationally determines the median of the elements of the partial matrix and outputs the median as the output value, the partial matrix having a number of rows smaller than number of rows of the input matrix and a number of columns same as the number of columns of the input matrix.

In another aspect of the present invention, there is provided an ultrasonic diagnostic apparatus for using a pixel value of each of pixels found in a predetermined range relative to a reference position of image data as input matrix and computing an output value corresponding to the input, the apparatus including:

an image processing section which sorts elements of each column of the input matrix one a row by row basis, extracts a partial matrix having the column including the reference position from the matrix obtained as a result of the sorting and computationally determines the median of the elements of the partial matrix and outputs the median as the output value, the partial matrix having a number of columns smaller than the member of columns of the input matrix and a number of rows same as the number of rows of the input matrix.

In still another aspect of the present invention, there is provided an ultrasonic diagnostic apparatus for using a pixel value of each of pixels found in a predetermined range relative to a reference position of image data as input matrix and computing an output value corresponding to the input, the apparatus including:

an image processing section which sorts elements of a first direction on an element by element basis in the second direction orthogonal to the first direction of the input matrix, extracts the elements of the first direction including the reference position, surrounding elements of the first direction from the matrix obtained as a result of the sorting, computationally determines the median of the elements of the partial matrix and outputs the median as the output value, the partial matrix having a number of elements in the first direction smaller than number of elements in the first direction of the input matrix and a number of elements in the second direction same as the number of elements in the second direction of the input matrix.

In still another aspect of the present invention, there is provided an ultrasonic diagnostic apparatus including:

an ultrasonic probe which transmits an ultrasonic to and receives an ultrasonic from an object of examination;

a transmitting/receiving section which transmits electrical signals to and receives electrical signals from the ultrasonic probe in order to transmit/receive an ultrasonic in a predetermined scanning direction;

an image processing section which uses the pixel value of each of the pixels found in a predetermined range relative to a reference position of image data as input matrix and computes an output value corresponding to the input according to the received ultrasonic signal obtained in the predetermined scanning direction and computationally determines an output value corresponding to the input for processing; and a display section which displays an ultrasonic image obtained by the processing by the image processing section, in which the image processing section sorts the elements of the first direction on an element by element basis in the second direction orthogonal to the first direction of the input matrix, extracts the elements of the first direction including the reference position, surrounds elements of the first direction from the matrix obtained as a result of the sorting, and computationally determines the median of the elements of the partial matrix and outputs the median as the output value, the partial matrix having a number of elements in the first direction smaller than number of elements in the first direction of the input matrix and a number of elements in the second direction same as the number of elements in the second direction of the input matrix.

In a further aspect of the present invention, there is provided an image filtering method of using a pixel value of each of pixels found in a predetermined range relative to a reference position of image data as input matrix and computing an output value corresponding to the input, the method including:

a first step of sorting the elements of the first direction for each of the elements of the second direction orthogonal to the first direction of the input matrix;

a second step of extracting the elements of the first direction including the reference position and surrounding elements of the first direction from the matrix obtained as a result of the sorting, the partial matrix having a number of elements in the first direction smaller than number of elements in the first direction of the input matrix and a number of elements in the second direction same as the number of elements in the second direction of the input matrix; and a third step of computationally determining the median of the elements of the partial matrix and outputting the median as the output value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram of a first embodiment of ultrasonic diagnostic apparatus according to the present invention, showing the overall configuration thereof;

FIG. 2 is a schematic block diagram of a Doppler image processing section 20 of FIG. 1, showing the configuration thereof in detail;

FIGS. 4A through 4F are graphs illustrating a processing sequence of the sorting filter 44, showing the pixel values obtained after the end of the processing sequence;

FIGS. 6A through 6E are graphs illustrating a processing sequence of the sorting filter 44 according to a second embodiment of the present invention;

FIGS. 8A through 8F are graphs illustrating a processing sequence of the sorting filter according to a fourth embodiment of the present invention.

DETAILED DESCRIPTION OF THE INVENTION

Figure 3:
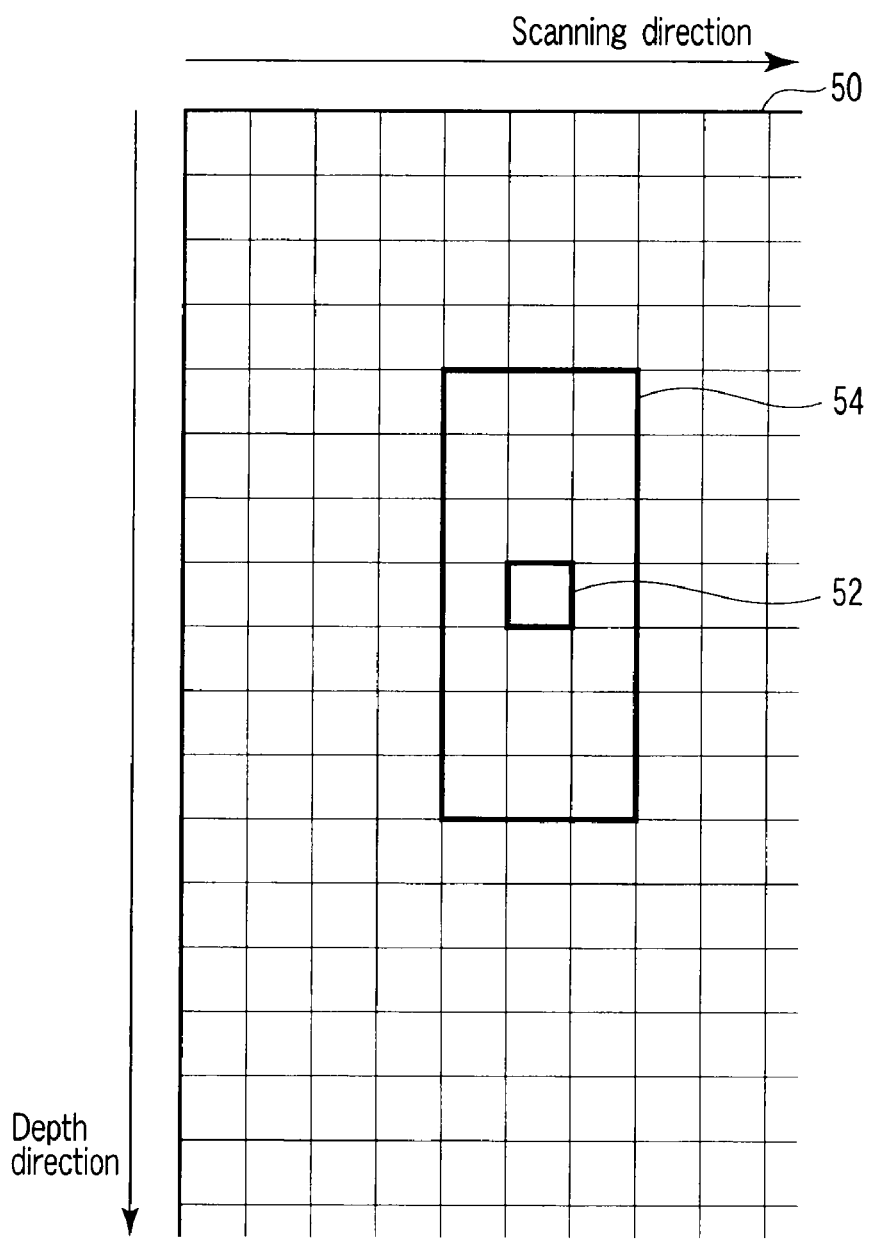
FIG. 3 is a graph illustrating a processing sequence of a sorting filter 44, showing the speed value image data at a predetermined clock time in the form of a matrix of the scanning direction and the depth direction.

Now, Embodiments of the present invention will be described in greater detail by referring to the accompanying drawings.

First Embodiment

FIG. 1 is a schematic block diagram of the first embodiment of ultrasonic diagnostic apparatus according to the present invention, showing the overall configuration thereof.

Referring to FIG. 1, an ultrasonic diagnostic apparatus 10 includes a ultrasonic probe 12, a transmission/reception section 14, an image processing section 16 and a display section 24.

The ultrasonic probe 12 transmits an ultrasonic to and receives an ultrasonic from an object of examination (not shown). The transmission/reception section 14 transmits an electrical signal to and receives an electrical signal from the ultrasonic probe 12 for the purpose of transmitting and receiving an ultrasonic for a predetermined scanning direction.

The image processing section 16 generates and processes B-mode ultrasonic image data according to a received ultrasonic signal obtained for a predetermined scanning direction. The image processing section 16 has a B-mode image processing section 18 for generating and processing B-mode image data from a received ultrasonic signal and a Doppler image processing section 20 for generating and processing Doppler image data from a received ultrasonic signal.

The display section 24 displays an ultrasonic image processed by the image processing section 16. The display section 24 has a scan converter 26 for converting the scanning mode of the ultrasonic image processed by the image processing section 16 into a display operation mode and a color monitor 28 for displaying the ultrasonic image obtained by the scan conversion by the scan converter 26.

The ultrasonic probe 12 of the ultrasonic diagnostic apparatus 10 having the above-described configuration irradiates an ultrasonic beam onto an object of examination (not shown) in a predetermined operating direction via the transmission/reception section 14. As the ultrasonic probe 12 receives the reflected beam, it outputs a reception signal (received echo) to the transmission/reception section 14. Then, the B-mode image processing section 18 generates and processes B-mode image data and the Doppler image processing section 20 generates and processes Doppler image data according to the ultrasonic signal received by the transmission/reception section 14 in the image processing section 16.

The B-mode image data and the Doppler image data that are generated and processed are then converted into data of operation display mode by the scan converter 26 in the display section 24. The ultrasonic image obtained by the san conversion by the scan converter 26 is displayed on the color monitor 28.

Now, the configuration of the Doppler image processing section 20 of FIG. 1 will be described in detail by referring to FIG. 2.

FIG. 2 is a schematic block diagram of the Doppler image processing section 20, showing the configuration thereof in detail. Referring to FIG. 2, the Doppler image processing section 20 has a quadrature phase detector 32, an analog-to-digital converter 34, a Doppler signal storage section 36, an MTI (moving target indication) filter 38, an autocorrelator 40, an arithmetic unit 42, a nonlinear spatial filter (sorting filter) 44 and a linear spatial filter (smoothing filter) 46.

The quadrature phase detector 32 operates for quadrature phase detection on the reception signal obtained by a plurality of ultrasonic receptions and outputs IQ signals having I and Q components that show a phased difference of 90°. The IQ signals are then converted into digital signals by the analog-to-digital converter 34 and sequentially stored in the Doppler signal storage section 36. The IQ signals stored in the Doppler signal storage section 36 in the order of the positions (depths) of the same scanning direction are read out in the order of the clock times of transmission/reception at the same position.

The MTI filter 38 removes the signal component attributable to the move of the bio tissues (clutter signal component) of the IQ signal read out from the Doppler signal storage section 36 and only the blood flow information is extracted. The autocorrelator 40 executes an autocorrelation process on the Doppler signal that has passed through the MTI filter 38. The arithmetic unit 42 computationally determines the average flow speed and the variance value of the blood flow and the power value to generate color Doppler image data based on the autocorrelation process.

The color Doppler image data output from the arithmetic unit 42 are subjected to a filtering process by the sorting filter 44 and the smoothing filter 46 and output to the display section 24. The sorting filter 44 smoothes the boundary lines of blood vessels and blood flow distributions, removes noises and reduces image skips. The sorting filter 44 takes a major part of this embodiment and the processing sequence thereof will be described in greater detail hereinafter.

The sorting filter 44 corresponds to a median filter of the conventional art. The smoothing filter 46 also operates to smooth an image but the transfer function thereof is generally linear and the filtering effects of the smoothing filter 46 differ from those of the sorting filter 44.

Note that, while image data are processed sequentially by the sorting filter 44 and then by the smoothing filter 46 in this embodiment, the processing sequence is by no means limited thereto and the smoothing filter 46 may be arranged upstream relative to the sorting filter 44. Also note that, while the sorting filter only processes speed value image data of color Doppler image data in this embodiment, it may alternatively be so arranged that it also processes variance value image data and power value image data.

Now, the processing sequence of the sorting filter 44 will be described below by referring to FIGS. 3 and 4A through 4F.

FIG. 3 is a graph showing the speed value image data at a predetermined clock time in the form of a matrix of the scanning direction and the depth direction.

Of the matrix 50 of the entire speed value image data, a predetermined position 52 is selected as reference position and a predetermined range of values is defined as input matrix 54 for the purpose of filtering the predetermined position 52. FIG. 4A is a graph showing exemplar pixel values of the input matrix 54. In the first processing step (Stage 1 [first step]) of the sorting filter 44, the values of each of the columns of the input matrix 54 are rearranged (sorted) in ascending order. While all values are rearranged (sorted) in ascending order in this embodiment, the same result will be obtained by rearranging all values in descending order.

FIG. 4B shows the pixel values arranged in the form of a matrix 54a of seven rows and three columns as a result of the first processing step. Note that each of the columns is enclosed by a frame and the columns are denoted respectively by 56a, 56b and 56c.

Then, in the second processing step (Stage 2 [second step]) of the sorting filter 44, partial matrix 58 is extracted from the matrix 54a of seven rows and three columns produced as a result of the sorting operation of the first processing step. In this embodiment, a total of three rows including the row 60b having the reference position 52 and the two neighboring rows 60a and 60c are extracted as shown in FIG. 4C. As a result, a partial matrix 58 of three rows and three columns is produced.

While the number of rows and that of columns of the input matrix 54 of this embodiment is seven rows and three columns, the number of rows and that of columns of an input matrix that can be used for the purpose of the present invention do not need to be so by any means. For instance, an input matrix of three rows and three columns or an input matrix of five rows and five columns may alternatively be used. However, both the number of rows and that of columns are preferably odd numbers. While the number of columns of the partial matrix 58, any number of rows may be used for the partial matrix 58 so long as it is smaller than the number of rows of the input matrix 54. An input matrix of three rows and three columns and an input matrix of five rows and five columns are employed respectively in the third and fourth embodiments as will be described hereinafter.

Then, in the third processing step of the sorting filter 44, the median of the partial matrix 58 is selected as the output value of the sorting filter 44. Note that each of the columns is already sorted at the stage of FIG. 4C and hence it is only necessary to execute two steps as will be described hereinafter in this processing sequence.

More specifically, in the first step of the third processing step (Stage 3-1 [third step]), each of the rows of the partial matrix 58 is sorted. FIG. 4D shows an example of the pixel values that may be produced as a result of the third step.

In the next step of the third processing step (Stage 3-2 [fourth step]), the first row/third column, second row/second column and third row/first column are extracted from the partial matrix 58a that is produced as a result of the sorting of the first step (third step) and the pixels of the other positions are removed. In other words, the pixels 62 including that of the reference position 52 remain but the pixels 64a, 64b are removed as shown in FIG. 4E. This is because it is logically clarified when the above-described fourth step ends that the pixel values other than those at the positions of the first row/third column, second row/second column and third row/first column do not represent the median.

Then, the set of pixels 62 of the three pixels are sorted to obtain a set of pixels 62a as shown in FIG. 4F and the pixel of the reference position 52 is selected as output.

The degree of analogy of the filter of this embodiment relative to a median filter can be computationally determined in the following manner.

Firstly the probability that the outcome of filtering of this embodiment agrees with that of filtering of a median filter of the same size of input matrix is computed. The requirements to be met for the two outcomes to agree are listed below.

(i) The pixel position that indicates the median ("25" in this embodiment) of the input matrix 54 is found somewhere in the partial matrix 58 and hence between the third row and the fifth row of the matrix 54a when the above-described first step ends.

(ii) The number of pixels having values smaller than the output value of the filter is equal to the number of pixels having values larger than the output value of the filter in the partial matrix 58. This is because the output value of the filter of this embodiment is the median of the partial matrix 58.

For example, both the filter of this embodiment and a median filter produce "25" when they satisfy the requirements of (i) and (ii). For the computation of the probability, the group of pixels having values smaller than the output value of the filter is referred to as group A (number of elements N) and the group of pixels having values larger than the output value of the filter is referred to as group B. Then, equation 1, below, holds true when the above requirements are met.

$$P = \Sigma P_1 \cdot P_2 \quad (1)$$

In the above equation, $P_1$ represents the probability that the number of pixels of the group A is x when the pixels of the column that includes the output value of the filter are selected from the groups A and B and $P_2$ represents the probability that the number of pixels of the group B is y when the pixels of the other columns are selected from the pixels left thereafter.

Then, $P_1$ and $P_2$ are expressed by equations 2 and 3 respectively.

$$P_1 = \frac{{}_N C_x \cdot {}_{20-N} C_{6-x}}{{}_{20} C_6} \quad (2)$$

$$P_2 = \frac{{}_{N-x} C_y \cdot {}_{14-(N-x)} C_{7-y}}{{}_{14} C_7} \quad (3)$$

Since the output value of the filter is equal to the median, the number of elements N of the group A is 10. Thus, Table 1 shown below is obtained by combining x, y, $P_1$, $P_2$ and $P_1 P_2$.

TABLE 1

| x | y | $P_1$ | $P_2$ | $P_1 P_2$ |
|---|---|---|---|---|
| 3 | All values | 0.3715 | 1 | 0.3715 |
| 2 | 3 | 0.2438 | 0.2448 | 0.0597 |
| 2 | 4 | 0.2438 | 0.4079 | 0.0995 |
| 2 | 5 | 0.2438 | 0.2448 | 0.0597 |
| 4 | 2 | 0.2438 | 0.2448 | 0.0597 |
| 4 | 3 | 0.2438 | 0.4079 | 0.0995 |
| 4 | 4 | 0.2438 | 0.2448 | 0.0597 |
| | | | | P = 0.8091 |

The probability that the outcome of the filtering of this embodiment agrees with that of a median filter is 0.8091.

Now, the probability that the outcome of the filtering of this embodiment agrees with that of a median filter when the order of sorting is changed only for a couple of elements will be computed.

Equations 1 and 2, above, are used and N=11 or 9 is selected for the computation of the probability. P=0.0804 is obtained for both N=11 and N=9, although the process of computation is not shown here.

From the above, the probability that the outcome of the filtering of this embodiment differs from that of a median filter when the order of sorting is changed for a couple of elements at most is 0.8091+2×0.0804=0.97. Thus, it may be safe to conclude that the filter of this embodiment produces an outcome that is substantially same as that of a median filter.

The computation method of a perfect median filter of seven rows and three columns will be described below by referring to FIGS. 5A through 5D in order to prove that this embodiment can compute faster than a median filter with a fewer number of computations.

While the sequence of obtaining matrix 54a by sorting each of the columns of the original input matrix 54 is the same for both this embodiment and a median filter, the subsequent sequence differs between them.

Figures 5A, 5B, 5C, 5D:
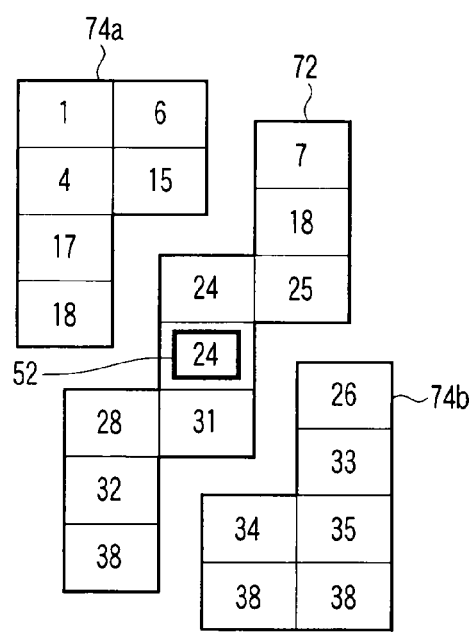
FIGS. 5A through 5D are graphs illustrating another processing sequence of the sorting filter 44, showing examples of the pixel values obtained after the end of the processing sequence, using the computation method of a complete median filter of seven rows and three columns.

A median filter sorts the entire matrix 54a as shown in FIG. 5A and then on a row by row basis to obtain a matrix 54b as shown in FIG. 5B. FIGS. 5A and 5B show values before and after the sorting. Note that each of the rows is enclosed by a frame and the rows are denoted respectively by 70a through 70g.

The pixels indicated by 72 in FIG. 5C are extracted from the matrix 54b. All the pixels of the other positions that are indicated by 74a and 74b in FIG. 5C are removed because none of them represent the median. The pixels 72 are rearranged for rows to obtain a matrix 72a as shown in FIG. 5D.

The right median of the input matrix 54 is obtained at predetermined position 52 by executing a process same as the process executed on the partial matrix 58 by this embodiment.

The number of times of computations of the above-described perfect median filter of seven rows and three columns will be computationally determined as the number of comparison and switching of two pixels.

Three and sixteen comparisons are required to sort 3×7 data by way of a merge=switching process respectively. Thus, the numbers of times of comparison required for each step and the total are as follows.

sorting on a column by column basis of 7 rows and 3 columns . . . 48 sorting on a row by row basis of 7 rows and 3 columns . . . 21 sorting on a row by row basis of 3 rows and 3 columns . . . 9 sorting of 3 pixels . . . 3 total . . . 81

Conversely, the numbers of times of computations of this embodiment of seven rows and three columns are as follows.

sorting on a column by column basis of 7 rows and 3 columns . . . 48 sorting on a row by row basis of 3 rows and 3 columns . . . 9 sorting of 3 pixels . . . 3 total . . . 60

The number of times of computations of this embodiment is smaller than that of a median filter, although the net result is the same. Thus, this embodiment can perform a high-speed image filtering operation.

Second Embodiment

Now, the second embodiment of the present invention will be described below.

The configuration and the basic operation of each of the second through fourth embodiments of ultrasonic diagnostic apparatus 10 are the same as those of the first embodiment described above by referring to FIGS. 1 and 2. Therefore, the components of those embodiments that are the same as those of the first embodiment are denoted respectively by the same reference symbols and the configuration and the operation of the embodiments will not be described below any further. In other words, those embodiments will be described below only in terms of difference.

While the elements of each of the rows of the input matrix 54 are firstly sorted on a column by column basis and then a partial matrix including a reference position and neighboring rows are extracted from the input matrix as a result of the sorting in the above-described first embodiment. However, the present invention is by no means limited thereto. For example, the elements of each of the columns of the input matrix 54 may firstly be sorted on a row by row basis as in the second embodiment.

Now, the processing sequence of the sorting filter 44 of the second embodiment will be described below by referring to FIGS. 6A through 6E.

FIG. 3 is a graph showing the speed value image data at a predetermined clock time in the form of a matrix of the scanning direction and the depth direction.

Figures 6A, 6B, 6C, 6D, 6E:
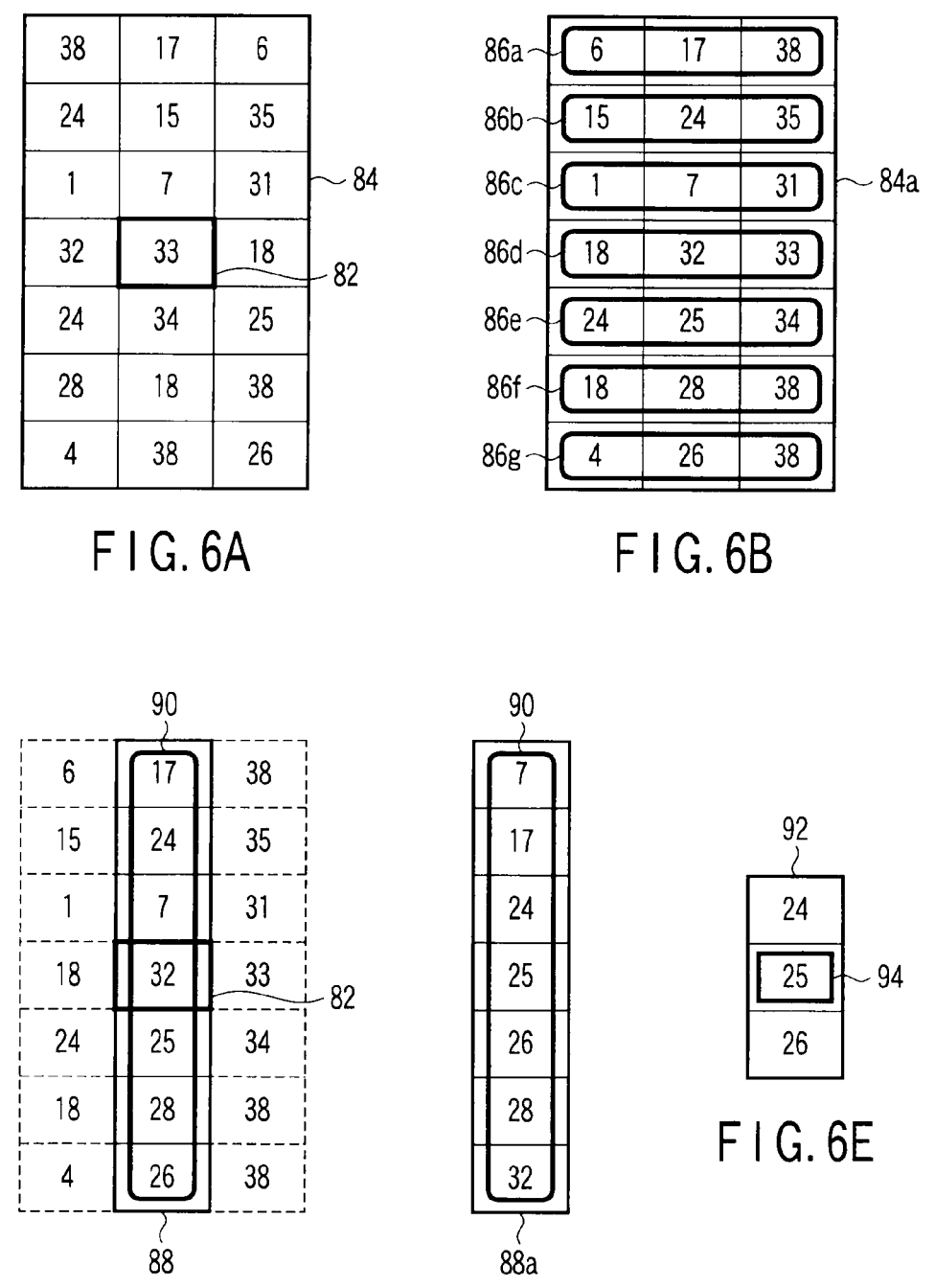

FIG. 6A is a graph showing exemplar pixel values of the input matrix 84. The values of each of the rows of the input matrix 84 are sorted in the first step of the sorting filter 44. FIG. 6B shows the pixel values arranged in the form of a matrix 84a of seven rows and three columns as a result of the first processing step. Note that each of the rows is enclosed by a frame and the rows are denoted respectively by 86a through 86g as shown in FIG. 6B.

Then, in the second step of the sorting filter 44, partial matrix 88 is extracted from the matrix 84a of seven rows and three columns produced as a result of the sorting operation of the first processing step. In this embodiment, the single column 90 having the reference position 82 is extracted as shown in FIG. 6C. Then, as a result, the partial matrix 88 is a matrix of seven rows and a single column.

Subsequently, the column of the partial matrix 88 is sorted in the third step of the sorting filter 44. FIG. 6D shows the pixel values obtained as a result of the third step.

Then, in the fourth step, all the pixels are removed from the partial matrix 88a produced as a result of the sorting in the third step except the pixels 92 including the reference position 94 as shown in FIG. 6E.

The number of times of computations of the above process is listed below.

sorting on a row by row basis of 7 rows and 3 columns . . . 21 sorting of 7 rows and 1 column . . . 16 total . . . 38

Thus, the number of times of computations of this embodiment is smaller than that of a perfect median filter of seven rows and three columns. Note, however, that the image quality of this embodiment needs to be checked in a manner different from the first embodiment because the filter characteristics and the analogy of this filter relative to a median filter are different from those of the first embodiment.

Thus, the net result will be similar to that of the above-described first embodiment if the sorting sequence is changed.

While all values are sorted in ascending order in this embodiment as in the first embodiment, the same result will be obtained by rearranging all values in descending order. It will be appreciated that the number of rows and that of columns of the input matrix of this embodiment may not necessarily be the same as those described above.

Third Embodiment

Now, the third embodiment of the present invention will be described below.

The sorting filters of the above described first and second embodiments are those of seven rows and three columns. The sorting filter of the third embodiment is that of three rows and three columns that are popular for median filters.

The processing sequence of the sorting filter of three rows and three columns (3×3) will be described below by referring to FIGS. 7A through 7D.

Figure 7A:
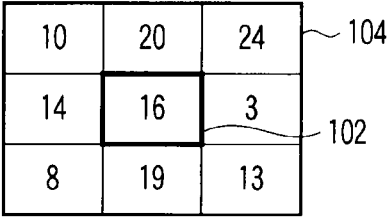
FIGS. 7A through 7D are graphs illustrating a processing sequence of the sorting filter 44 according to a third embodiment of the present invention.
Figure 7B:
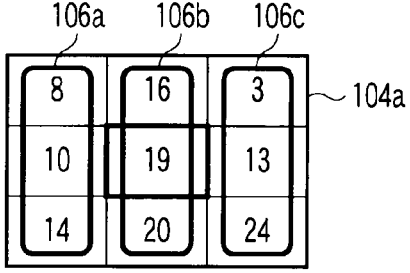

FIG. 7A is a graph showing exemplar pixel values surrounding a predetermined position 102. The pixel values of the neighboring columns of the predetermined position 102 of the input matrix 104 are sorted on a column by column basis as in the case of the preceding embodiments. FIG. 7B shows the pixel values obtained as a result of the first processing step. Note that each of the columns is enclosed by a frame and the columns are denoted respectively by 106a, 106b and 106c as shown in FIG. 7B.

Figure 7C:
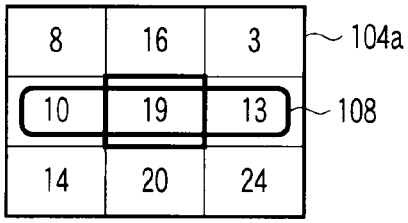
Figure 7D:
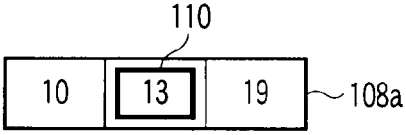

Then, the second row 108 is extracted from the matrix 104a of three rows and three columns that is subjected to the above described sorting operation conducted on a column by column basis as shown in FIG. 7C. Thereafter, the pixels 108a are sorted out and the median thereof is selected as the output value 110 of the sorting filter as shown in FIG. 7D.

The processing sequence of conventional median filters is such that the three columns, the three rows and three pixels are sorted sequentially. Conversely, the processing sequence of this embodiment is such that the three columns and a single row (and hence three pixels) are sorted sequentially. Thus, it will be clear that the number of computations of this embodiment is fewer than that of a median filter if the size of the input matrix is the same.

The number of times of computations of the above-described embodiment is smaller than that of a median filter and this embodiment can perform a high-speed filtering operation.

Fourth Embodiment

Now, the fourth embodiment of the present invention will be described below.

The sorting filter of the above-described third embodiment is that of a square matrix of three rows and three columns. A sorting filter of five rows and five columns requires a process that is more complex than a sorting filter of three rows and three columns although both of them are sorting filters of a square matrix. The processing sequence of the sorting filter 44 of the fourth embodiment of the present invention will be described below by referring to FIGS. 8A through 8F.

Figures 8A, 8B, 8C, 8D, 8E, 8F:
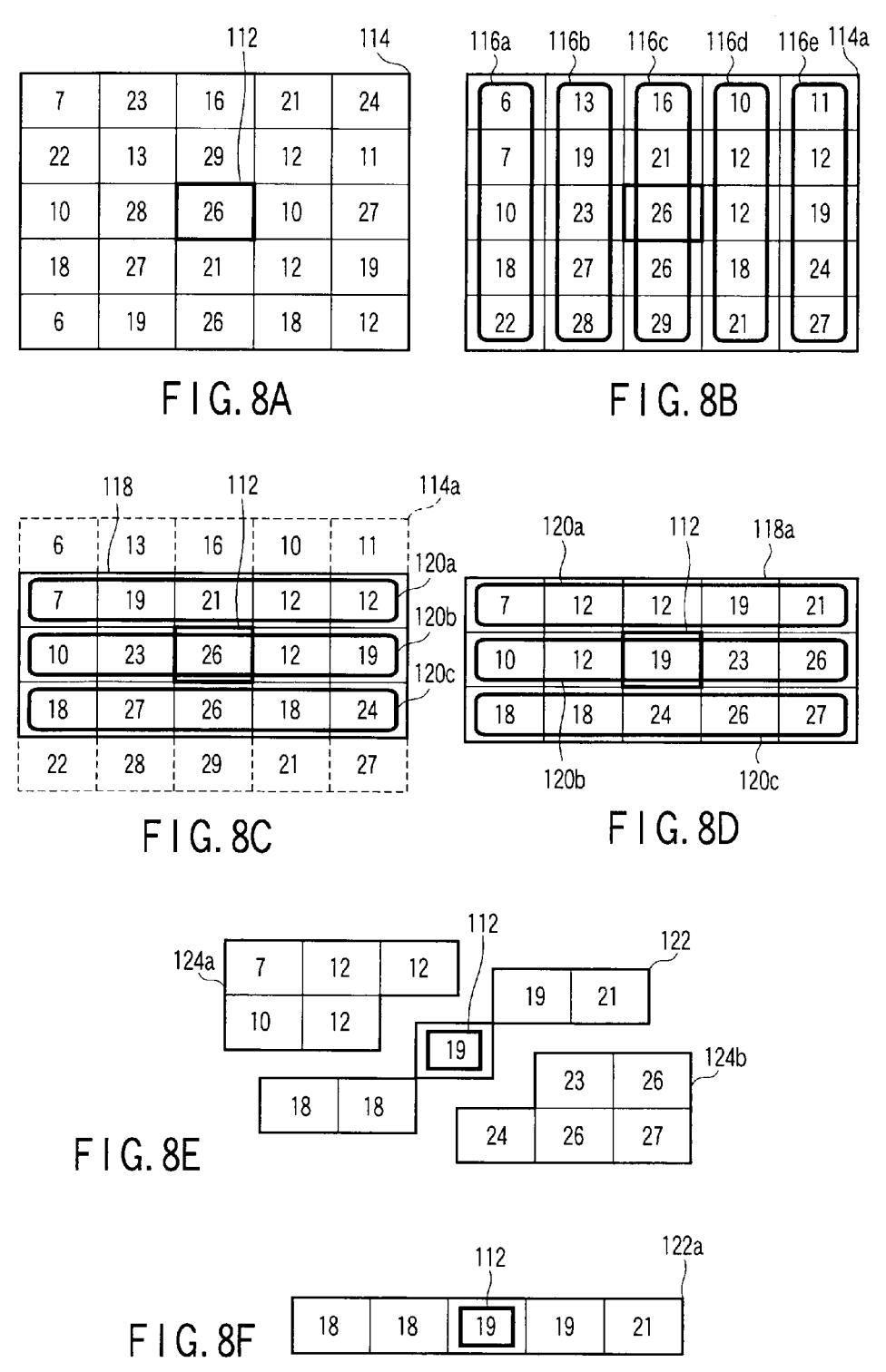

FIG. 8A is a graph showing exemplar pixel values of input matrix 114 surrounding a predetermined position 112. In the first processing step (Stage 1 [first step]) of the sorting filter 44, the values of each of the columns of the input matrix 114 are rearranged (sorted) in ascending order. While all values are sorted in ascending order in this embodiment, the same result will be obtained by sorting all values in descending order.

FIG. 8B shows the pixel values arranged in the form of a matrix 114a of five rows and five columns as a result of the first processing step. Note that each of the columns is enclosed by a frame and the columns are denoted respectively by 116a through 116e.

Then, in the second processing step (Stage 2 [second step]) of the sorting filter 44, partial matrix 118 is extracted from the matrix 114a of five rows and five columns produced as a result of the sorting operation of the first processing step. In this embodiment, a total of three rows including the row 120b having the reference position 112 and the two neighboring rows 120a and 120c are extracted as shown in FIG. 8C. As a result, a partial matrix 118 of three rows and five columns is produced.

Then, as the third processing step of the sorting filter 44, partial matrix 118 is selected as the output value of the sorting filter 44. However, since the sorting operation of each column is finished at the time shown in FIG. 8C, in this embodiment, two stages which will be described later need to be performed.

In the first step of the third processing step (Stage 3-1 [third step]), each of the rows of the partial matrix 118 is sorted. FIG. 8D shows an example of the pixel values that may be produced as a result of the third step.

In the next step of the third processing step (Stage 3-2 [fourth step]), the first row/fifth column, first row/fourth column, second row/third column, third row/second column and third row/first column are extracted from the partial matrix 118a that is produced as a result of the sorting of the first stage (third step) and the pixels of the other positions are removed. In other words, the set of pixels 122 including the pixel of the reference position 112 remain but the sets of pixels 124a, 124b are removed as shown in FIG. 8E because none of those pixels represent the median.

Then, the set of pixels 122 of the five pixels are sorted to obtain a set of pixels 122a as shown in FIG. 8F and the pixel of the reference position 112 is selected as output.

Now, for the purpose of comparing the number of times of computations of this embodiment and that of a median filter having an input matrix of exactly the same size, the computation method of a complete median filter of five rows and five columns will be described below by referring to FIGS. 9A through 9C. Note that this method is described in the above cited "Fast algorithms for Median Filtering", Intel Corporation 2001, after pp. 8.

While the sequence of obtaining matrix 114a by sorting each of the columns of the original input matrix 114 is the same for both this embodiment and a median filter, the subsequent sequence differs between them.

Figure 9A:
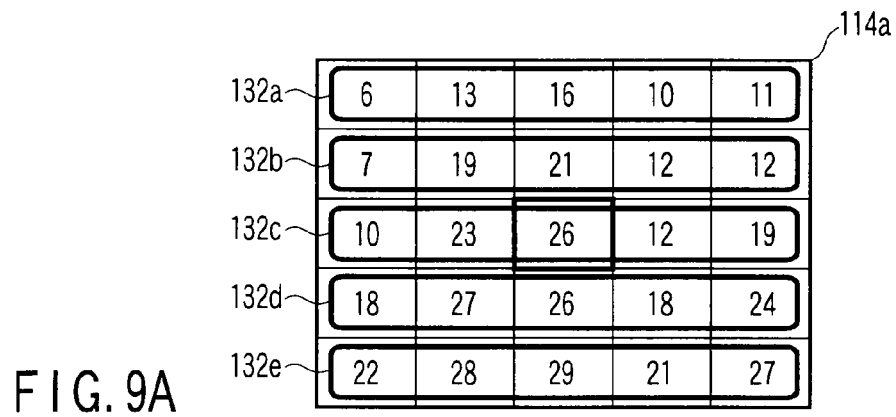
FIGS. 9A through 9C are graphs illustrating a processing sequence of the sorting filter 44 according to the fourth embodiment of the present invention, showing examples of the pixel values obtained after the end of the processing sequence, using the computation method of a complete median filter of five rows and five columns.
Figure 9B:
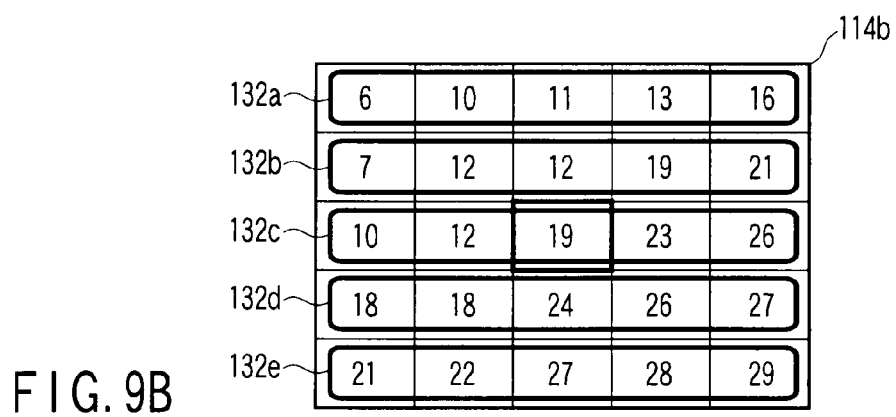

A median filter sorts the entire matrix 114a as shown in FIG. 9A and then on a row by row basis to obtain a matrix 114b as shown in FIG. 9B. FIGS. 9A and 9B show values before and after the sorting. Note that each of the rows is enclosed by a frame and the rows are denoted respectively by 132a through 132e.

Figure 9C:
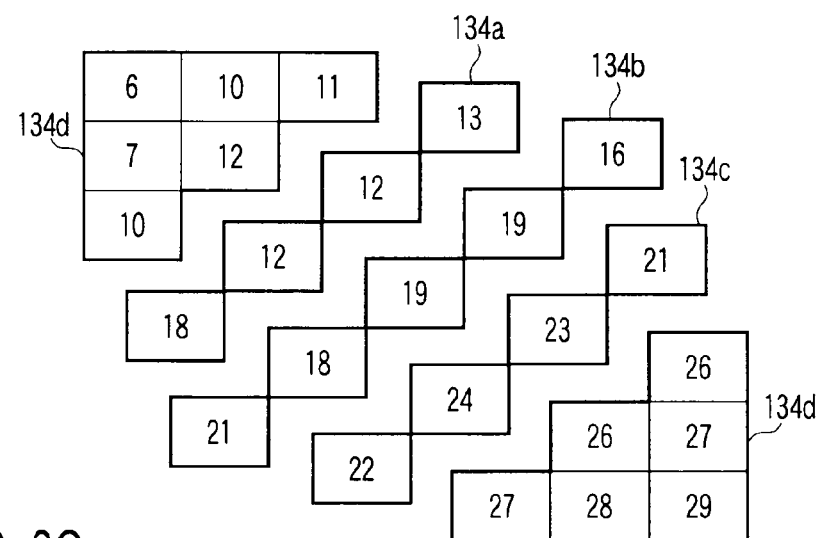

Then, the pixels of the matrix 114b are classified into four groups as shown in FIG. 9C. The numerals in each parenthesis denote (column, row).

134a . . . (1, 4), (2, 3), (3, 2), (4, 1)
134b . . . (1, 5), (2, 4), (3, 3), (4, 2), (5, 1)
134c . . . (2, 5), (3, 4), (4, 3), (5, 2)
134d . . . pixels other than above The pixels of 134d are removed because none of them represent the median. The median of the three pixels including the smallest value of 134a (which is "18"), the median of 134b (which is "19") and the largest value of 134c (which is "21") is the perfect median of the original input matrix 114.

The number of times of computations of a perfect median filter of five rows and five columns is shown below. Three and nine comparisons are required to sort 3×5 data by way of a merge=switching process respectively.

sorting on a column by column basis of 5 rows and 5 columns . . . 45
sorting on a row by row basis of 5 rows and 5 columns . . . 45
selection of the largest value of 4 pixels . . . 3
selection of the smallest value of 4 pixels . . . 3
sorting of 5 pixels . . . 9
sorting of 3 pixels . . . 3
total . . . 108

Conversely, the numbers of times of computations of this embodiment of five rows and five columns are as follows.

sorting on a column by column basis of 5 rows and 5 columns . . . 45
sorting on a row by row basis of 3 rows and 5 columns . . . 27
sorting of 5 pixels . . . 9
total . . . 81

The number of times of computations of this embodiment is smaller than that of a median filter, although the net result is the same. Thus, this embodiment can perform a high-speed image filtering operation.

While the present invention is described above by way of embodiments, the above embodiments can be modified and altered in various different ways without departing from the spirit and scope of the invention.

The above-described embodiments contain various stages of the invention and hence various different inventions may be extracted by appropriately combining the plurality of components disclosed herein. For example, when the object of the present invention as described above is achieved by omitting some of the components of any of the above-described embodiments, the arrangement realized by omitting such components is also within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic diagnostic apparatus for using a plurality of pixels found in a predetermined range relative to a reference pixel position of image data as an input matrix, and computing an output value corresponding to the input matrix, the apparatus comprising:
a processing circuit configured to sort, in ascending or descending order, elements of the input matrix on a column by column basis to generate a sorted matrix, extract a partial matrix from the sorted matrix, the partial matrix having a row including the reference pixel position, and surrounding rows from the sorted matrix, computationally determine a median of elements of the partial matrix, and output the median as the output value, the partial matrix having a number of rows smaller than a number of rows of the input matrix and a same number of columns as a number of columns of the input matrix.

2. The apparatus according to claim 1, wherein
the processing circuit is configured to sort the elements of each of the columns of the extracted partial matrix on a row by row basis and to remove, from the extracted partial matrix, elements at predetermined positions that are logically known as not representing the median of the elements of the partial matrix.

3. An ultrasonic diagnostic apparatus for using a plurality of pixels found in a predetermined range relative to a reference pixel position of image data as an input matrix, and computing an output value corresponding to the input matrix, the apparatus comprising:

a processing circuit configured to sort, in ascending or descending order, elements of the input matrix on a row by row basis to generate a sorted matrix, extract a partial matrix from the sorted matrix, the partial matrix having a column including the reference pixel position, computationally determine a median of the elements of the partial matrix, and output the median as the output value, the partial matrix having a number of columns smaller than a number of columns of the input matrix, and a same number of rows as a number of rows of the input matrix.

4. The apparatus according to claim 3, wherein the processing circuit is configured to sort the elements of each of the rows of the extracted partial matrix on a column by column basis, and remove, from the extracted partial matrix, elements at predetermined positions that are logically known as not representing the median of the elements of the partial matrix.

5. An ultrasonic diagnostic apparatus for using a plurality of pixels found in a predetermined range relative to a reference pixel position of image data as an input matrix, and computing an output value corresponding to the input matrix, the apparatus comprising:

a processing circuit configured to sort, in ascending or descending order, elements of a first direction on an element by element basis in a second direction orthogonal to the first direction of the input matrix to generate a sorted matrix, extract, from the sorted matrix, a partial matrix including the elements of the first direction including the reference pixel position and surrounding elements in the first direction, computationally determine a median of elements of the partial matrix, and output the median as the output value, the partial matrix having a number of elements in the first direction smaller than a number of elements in the first direction of the input matrix, and a same number of elements in the second direction as a number of elements in the second direction of the input matrix.

6. The apparatus according to claim 5, wherein the processing circuit is configured to sort the elements of the second direction of the extracted partial matrix on an element by element basis in the first direction, and remove, from the extracted partial matrix, elements at predetermined positions that are logically known as not representing the median of the elements of the partial matrix.

7. The apparatus according to claim 5 or 6, wherein the first direction is a row direction and the second direction is a column direction.

8. The apparatus according to claim 5 or 6, wherein the first direction is a column direction and the second direction is a row direction.

9. An ultrasonic diagnostic apparatus, comprising:

an ultrasonic probe configured to transmit ultrasonic waves to and receive received ultrasonic waves from an object of examination;

a transmitting/receiving section configured to transmit electrical signals to and receive ultrasonic electrical signals from the ultrasonic probe in order to transmit/receive the ultrasonic waves in a predetermined scanning direction;

a processing circuit configured to use a plurality of pixels found in a predetermined range relative to a reference pixel position of image data as an input matrix, compute an output value corresponding to the input matrix according to the received ultrasonic electrical signals obtained in the predetermined scanning direction, and computationally determine an output value corresponding to the input matrix for processing; and a display configured to display an ultrasonic image obtained by the processing circuit, wherein the processing circuit is configured to sort, in ascending or descending order, elements of a first direction on an element by element basis in a second direction orthogonal to the first direction of the input matrix to generate a sorted matrix, extract from the sorted matrix, a partial matrix including the elements of the first direction including the reference pixel position and surrounding elements in the first direction, computationally determine a median of elements of the partial matrix, and output the median as the output value, the partial matrix having a number of elements in the first direction smaller than a number of elements in the first direction of the input matrix, and a same number of elements in the second direction as a number of elements in the second direction of the input matrix.

10. The apparatus according to claim 9, wherein the processing circuit is configured to sort the elements of the second direction of the extracted partial matrix on an element by element basis in the first direction, and remove, from the extracted partial matrix, elements at predetermined positions that are logically known as not representing the median of the elements of the partial matrix.

11. The apparatus according to claim 9, wherein the first direction is a row direction and the second direction is a column direction.

12. The apparatus according to claim 10, wherein the first direction is a row direction and the second direction is a column direction.

13. The apparatus according to claim 9, wherein the first direction is a column direction and the second direction is a row direction.

14. The apparatus according to claim 10, wherein the first direction is a column direction and the second direction is a row direction.

15. The apparatus according to any one of claims 9 through 14, wherein the processing circuit includes a filter that smoothes the boundary lines of blood distributions of the object of examination, removes noises, and reduces image skips.

16. An image filtering method of using a plurality of pixels found in a predetermined range relative to a reference pixel position of image data as an input matrix, and computing an output value corresponding to the input matrix, the method comprising:

a first step of sorting, in ascending or descending order, elements of a first direction on an element by element basis in a second direction orthogonal to the first direction of the input matrix to generate a sorted matrix;

a second step of extracting, from the sorted matrix, a partial matrix including the elements of the first direction including the reference pixel position and surrounding elements in the first direction the partial matrix having a number of elements in the first direction smaller than a number of elements in the first direction of the input matrix, and a same number of elements in the second direction as a number of elements in the second direction of the input matrix; and a third step of computationally determining a median of the elements of the partial matrix and outputting the median as the output value.

17. The method according to claim 16, wherein the third step comprises:

sorting the elements of the second direction on an element by element basis in the first direction; and removing the elements at the predetermined positions that are logically known as not representing the median of the elements of the partial matrix from the partial matrix obtained as a result of the sorting step.

18. The method according to claim 16, wherein
the first direction is a row direction and the second direction is a column direction.

19. The method according to claim 17, wherein
the first direction is a row direction and the second direction is a column direction.

20. The method according to claim 16, wherein
the first direction is a column direction and the second direction is a row direction.

21. The method according to claim 17, wherein
the first direction is a column direction and the second direction is a row direction.

* * * * *